United States Patent [19]

Yamashita

[11] Patent Number: 5,066,961

[45] Date of Patent: Nov. 19, 1991

[54] TONAL PRINTER UTILIZING HEAT PREDICTION AND TEMPERATURE DETECTION MEANS

[75] Inventor: Haruo Yamashita, Osaka, Japan

[73] Assignee: Matsushita Electric Industrial Co., Ltd., Osaka, Japan

[21] Appl. No.: 478,477

[22] Filed: Feb. 12, 1990

[30] Foreign Application Priority Data

Feb. 17, 1989 [JP] Japan .................................. 1-038609

[51] Int. Cl.[5] .............................................. G01D 15/10

[52] U.S. Cl. ................................................ 346/76 PH

[58] Field of Search ..................................... 346/76 PH

[56] References Cited

U.S. PATENT DOCUMENTS 4,547,784 10/1985 Erlichman et al. ............ 346/76 PH
4,563,691 1/1986 Noguchi et al. ............... 346/76 PH
4,688,051 8/1987 Kawakami et al. ............ 346/76 PH
4,827,281 5/1989 Lubinsky et al. .............. 346/76 PH
4,876,559 10/1989 Nishikawa ...................... 346/76 PH

FOREIGN PATENT DOCUMENTS 0260917 3/1988 European Pat. Off. .
58-164368 9/1983 Japan .
59-127781 7/1984 Japan .
59-127782 7/1984 Japan .

*Primary Examiner*—Benjamin R. Fuller
*Assistant Examiner*—N. Le
*Attorney, Agent, or Firm*—Stevens, Davis, Miller & Mosher

[57] ABSTRACT

A tonal printer is provided which controls recording density through determination of line-wise compensation factors. These factors are used to correct the variation of recording density attributable to the temperature of the head mount and the cumulative heat of the heating element substrate. The printer uses a predicted value of temperature rise caused by the cumulative heat in a portion of the heating element substrate, which is predicted on the basis of the accumulated amount of applied energy to the thermal head and a measured value of the temperature in a portion of the head mount. The printer accurately produces density at all levels independently of the differences in the density distribution of images and the environmental temperature. A method is provided of creating correction data at a reference temperature and reference cumulative heat.

10 Claims, 8 Drawing Sheets

TONAL PRINTER UTILIZING HEAT PREDICTION AND TEMPERATURE DETECTION MEANS

BACKGROUND OF THE INVENTION

This invention relates to the a system for accurate thermal compensation for the recorded density of thermal printers which perform multi-tone image printing, and it is widely applicable to thermal transfer printers or the like used as hardcopy devices for printing a television picture.

The thermal recording system which performs thermal recording by using a thermal transfer ink film or the like can more readily deal with colors and can be made more compact than ink-jet system an electronic photographic system, and because of its further advantages in picture quality, cost, maintenance, etc., this system is widely adopted for hardcopy devices which record pictorial images.

Generally, a color printer based on the thermal transfer system uses a thermal head, which comprises a lateral alignment of heating elements and an inked ribbon on which three colors of yellow (Y), magenta (M) and cyan (C) are distributed, and operates on the basis of three-color face sequential recording in which the recording paper is repositioned in each turn of color. For recording a pictorial image such as a television signal, the sublimation dye type thermal transfer printing is superior because of its higher performance in both remelt and toning, the controllability of recorded density and the smoothness of tonal recording, as compared with the system of dizzer, density pattern, etc.

However, such a system as the sublimation dye thermal transfer printing, which performs analog tonal density recording by varying the applied energy based on the current pulse width modulation, has its recording density dependent on the environmental temperature and is susceptible to the cumulative heat of the thermal head, and therefore it is difficult to have a stable production of recorded density. This temperature dependency is a major restricting limiting factor against the enhancement of the picture quality in developing these printers.

In the case of full color recording on a face sequential basis, the difference in environmental temperature and the difference of cumulative heat among colors result in a broken balance of the density of colors and in the variation of hue, and therefore more strict thermal compensation is required.

To cope with these problems, there have been proposed (1) a method of controlling the pixel applied energy with reference to the temperature of the head mount detected with a temperature detection means and the time length which has expired since the previous driving of the heating elements counted with a time count means (as disclosed in Japanese Patent Unexamined Publication No. 59-127782), (2) a method of controlling the applied energy by providing several ROM tables, in which relationships between the tonal level and current pulse width for several environmental temperatures are stored, and selecting a ROM in response to the temperature of the head mount or the like (as disclosed in Japanese Patent Unexamined Publication No. 58-164368), and (3) a method of controlling the pixel applied energy with reference to the amount of cumulative heat calculated from the states of several lines of heating elements which have been activated in the past and of adjoining elements (as disclosed in Japanese Patent Unexamined Publication No. 59-127781). These methods, however, involve the following deficiencies.

Thin-film thermal heads or the like used generally have a structure as shown in FIG. 2. The head involves a first dominant heat accumulation in the head mount determined from the thermal capacity of the head mount and its heat dispersing resistance to the atmosphere, a second heat accumulation in the heating element substrate, and a third heat accumulation in the heating elements themselves, and they have distinct thermal time constants of the order of several minutes, several seconds and several milliseconds, respectively.

The thermal compensation for two-level recording, which is mainly aimed at the stable reproduction of clear dot printing without the influence of the environmental temperature and the heat accumulation of the head at a high printing speed, merely needs a rough compensation accuracy, although the third heat accumulation in each heating element of pixel needs to be compensated.

In contrast, the thermal compensation for tonal recording has its density compensation accuracy raised to the grade of tone steps, thereby fulfilling the requirement of the accurate production of tone in steps through the recordings at arbitrary environmental temperatures. Because of its tighter requirement of the picture quality than of the recording speed, this recording system is less affected by the third heat accumulation in the heating elements themselves, although it needs accurate thermal compensations for the second heat accumulation in the heating element substrate and the first heat accumulation in the head mount.

The technique described in the above patent publication 59-127782 bases the compensating operation on the prediction of the third heat accumulation in pixel-wise heating elements from the time expiration since the previous recording action with the intention of high-speed two-level recording, and therefore it cannot be applied to the thermal compensation for the tonal recording.

The technique described in the above patent publication 59-127781 is intended to evaluate the subsequent applied energy by calculating the third heat accumulation in the heating elements themselves from weighted summation of energy-application patterns of specific heating elements used for the past several lines and a joining elements. This simple and more experimental, rather than theoretical, method for the calculation of the heat accumulation state can be useful for two-level recording, whereas it cannot compensate accurately for all tone steps, or it can even disturb tone levels, in tonal recording.

The technique described in the above patent publication 59-127782 based the applied energy control on the switching of ROM tables, in which relationships between the tonal level and current pulse width at several environmental temperatures are set, in response to such environmental temperature as the head mount temperature. Although this technique is intended for tonal recording, the control solely relies on the head mount temperature which can be measured during the recording operation, and it not only suffers from a significant delay of detection, but frequently fails to correlate the detected temperature with the recorded density for some object of recording. Therefore it is incapable of performing a sufficient density compensation.

None of the foregoing prior art techniques considers the second heat accumulation in the heating element substrate, failing in the density compensation against a great variation of cumulative heat of the order of several seconds in time, and it does not accomplish a sufficient thermal compensation for the tonal recording. Moreover, even in the case of successful prediction of the second heat accumulation in the heating element substrate, which measurement is difficult in reality, the formulation of applied energy based on the amount of cumulative heat is not yet established, and values of compensation parameter for each temperature are solely derived from experimental data and simulation data. These values are only significant for specific recording conditions and values for other conditions need to be determined on an experimential or trial-and-error basis, and therefore these methods involve an extremely difficult problem in achieving a correct production of recorded density at all tone levels.

SUMMARY OF THE INVENTION

An object of the present invention is to provide a tonal printer with the ability of temperature compensation for accurately producing densities of all tone levels for images with various density distributions to be recorded at arbitrary environmental temperatures.

Another object of the present invention is to provide a method of setting the characteristics of the γ compensating means of the tonal printer.

In order to achieve the above objectives, the printer of the present invention is designed to use an accumulated value of the thermal head applied energy of each line, a predicted value of the temperature rise caused by the cumulative heat at a portion of the heating element substrate attributable to the past applied energy and a measured value of the temperature in a portion of the thermal head mount detected with a temperature detection means, thereby to determine, for each line, the value of a compensation factor for correcting the variation of recorded density caused by the temperature of the head mount and the cumulative heat of the heating element substrate and to implement the compensation of applied energy using the compensation factor.

The printer of the present invention is also designed to record a solid area image at a prescribed applied energy in a time period longer than the thermal time constant of the heat conduction from the heating element substrate to the head mount thereby to achieve a reference amount of cumulative heat, and thereafter record an image, which produces densities in step variation in the direction of the thermal head line, at the moment when the head mount has reached a reference temperature, thereby to determine, through the measurement of the density, the characteristics of the r correction means at the reference temperature and reference cumulative heat conditions.

DESCRIPTION OF THE PREFERRED EMBODIMENTS

The arrangement of the tonal printer according to an embodiment of the present invention in as follows.

Figure 1:
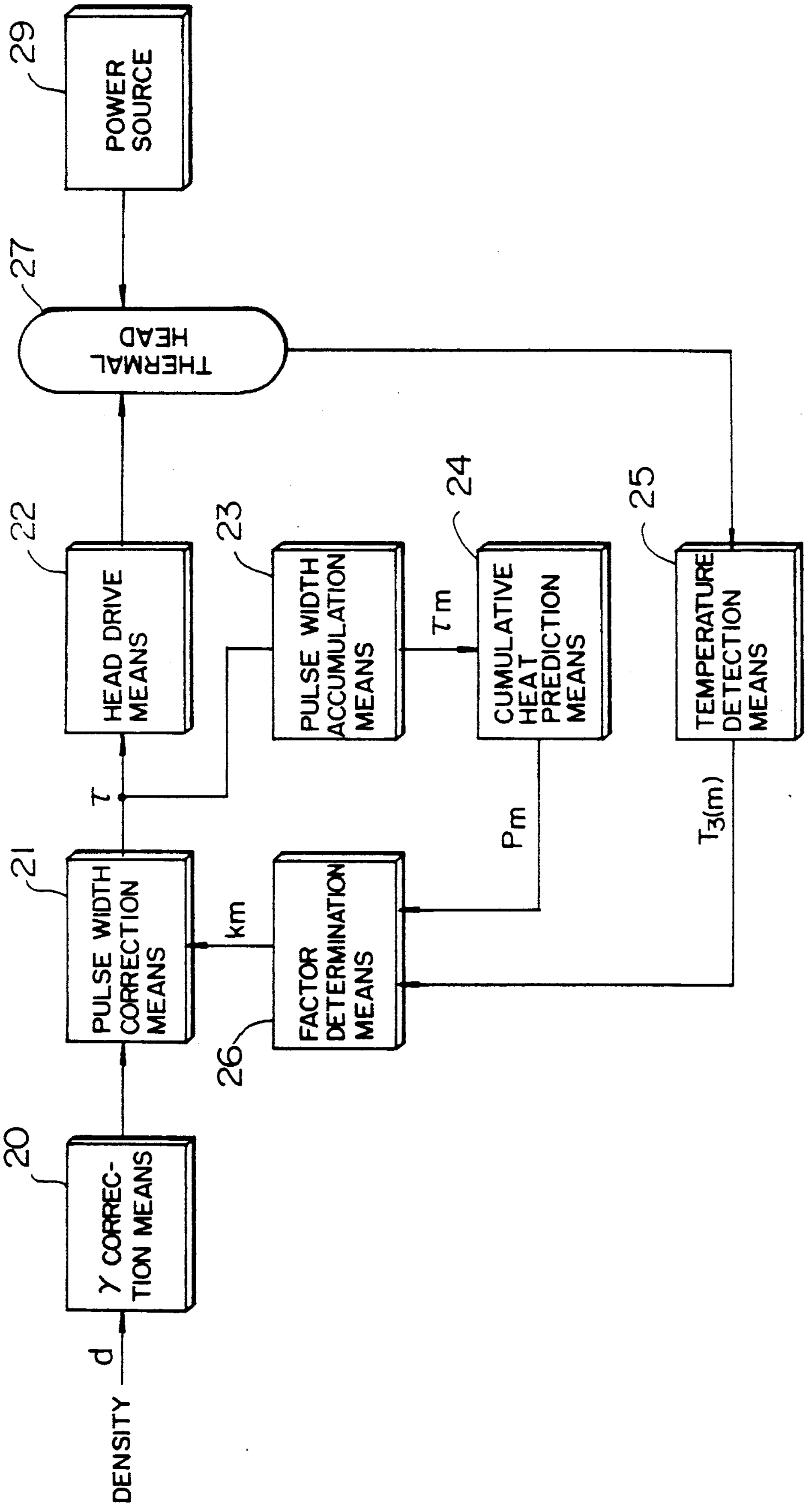
FIG. 1 is a block diagram of the tonal printer according to an embodiment of the present invention.

FIG. 1 shows an embodiment of the inventive tonal printer which is intended for the recording of densities with fidelity to the input density data through the thermal recording based on the pulse width control.

Indicated by 27 is a thermal head made up of many heating elements aligned on a heating element substrate, 29 is a power source for supplying power to the thermal head, 20 is a r correction means which converts density data into a corresponding application pulse width, 21 is a pulse width correction means which applies a compensation factor to the application pulse width, 22 is a head drive means which drives the thermal head 27 in a multi-step pulse width, 23 is a pulse width accumulation means which accumulates pulse widths for one line to evaluate a mean pulse width, 24 is a cumulative heat prediction means which predicts the amount of cumulative heat in the heating element substrate of the thermal head 27, 25 is a temperature detection means which detects the temperature of the head mount of the thermal head 27, and 26 is a factor determination means which calculates the temperature compensation factor from the head mount temperature detected by the temperature detection means 25 and the cumulative heat of the heating element substrate predicted by the cumulative heat prediction means 24.

Figure 7:
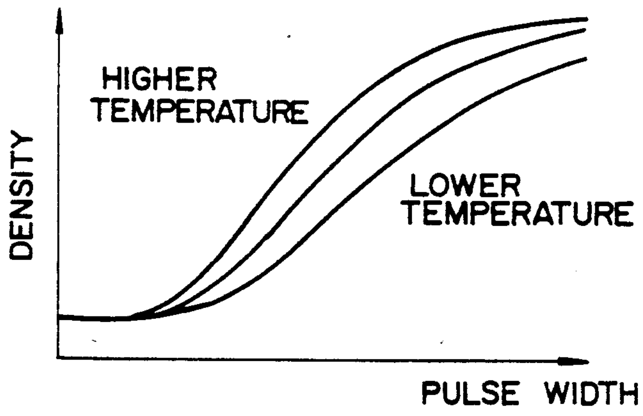
FIG. 7 is a graph showing the γ characteristics between the current pulse width and the density.

In thermal or thermal transfer recording, there is a nonlinear relationship, called γ characteristics, between the applied energy and the recorded density, as shown in FIG. 7. For achievement of precise density tones, the modification of the γ characteristics is necessary. The γ correction means 20 of this embodiment is formed of a ROM table, in which are stored application pulse widths needed for the recording of densities specified by the input data when the head mount is at the reference temperature and the heating element substrate has the reference cumulative heat, and, in response to the entry of density data, it reads out data of the application pulse width needed for recording the density. The pulse width correction means 21 operates to multiply a compensation factor provided by the factor determination means 26 to an application pulse width provided by the r correction means 20 thereby to produce a temperature-compensated application pulse width.

The pulse width accumulation means 23 accumulates pulse widths of all pixels for one line recorded by the head drive means thereby to evaluate a value which is proportional to the amount of cumulative heat produced in the whole thermal head 27 due to the recording of the line. The cumulative heat prediction means 24 uses the above result to predict the amount of cumulative heat caused by the total energy applied until now to the thermal head 27. The method of prediction will be explained later.

Figure 8:
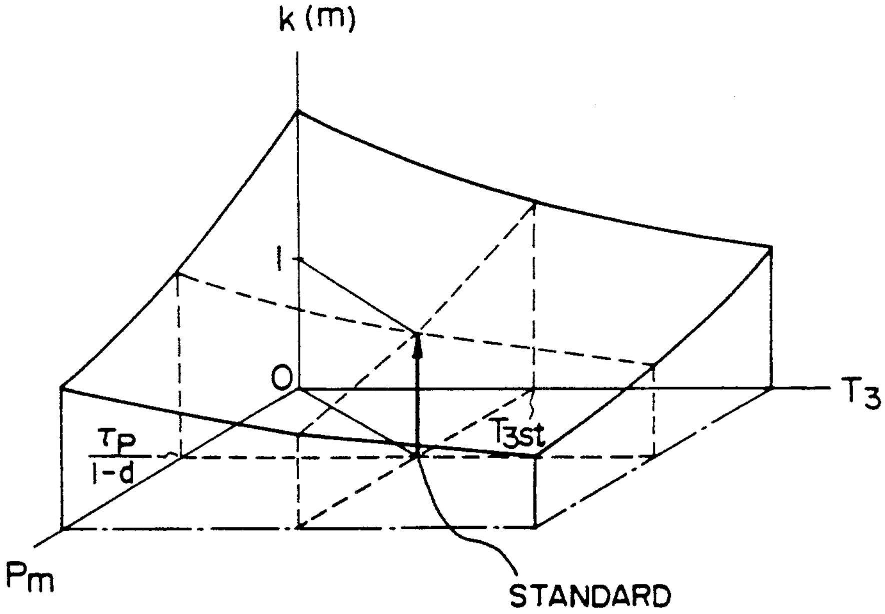
FIG. 8 is a characteristic diagram showing the compensation factor of the current pulse width for the head mount temperature and the cumulative heat.

The factor determination means 26 uses the cumulative heat of the heating element substrate predicted by the cumulative heat prediction means 24 and the head mount temperature detected by the temperature detection means 25 to calculate a compensation factor which takes a value of 1 when the head mount is at the reference temperature and the heating element substrate has the reference cumulative heat, or takes a value which simply decreases in proportion to the increase of either temperature or cumulative heat. In this embodiment, this means is formed of a ROM table which releases a compensation factor by being addressed in terms of the outputs of the cumulative heat prediction mean 24 and temperature detection means 25. For example, the ROM table has a setup of data which take a value km of 1 against the reference $T_3$ and Pm and has a hyperboloidic function of the temperature and cumulative heat, as shown in FIG. 8. These are the arrangement for compensating the variation of density due to the influence of the environmental temperature and cumulative heat of the head mount and the cumulative heat of the heating element substrate.

Figure 2:
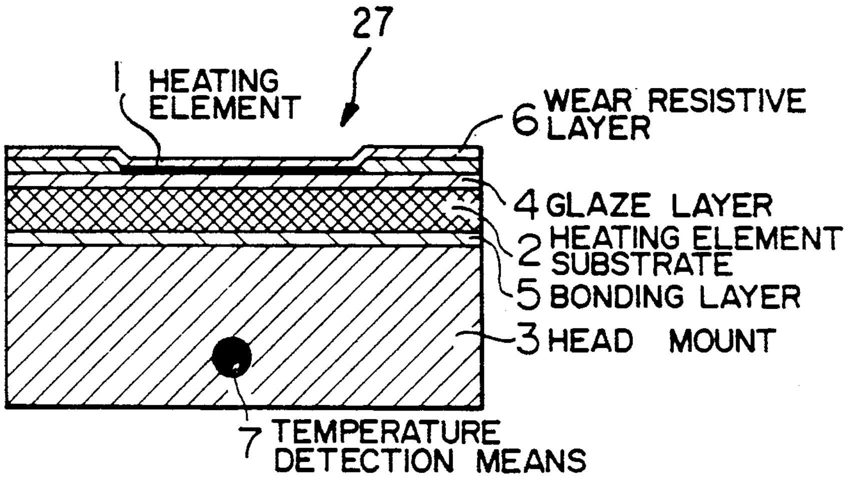
FIG. 2 is a cross-sectional view of the thermal head.

Next, the method of determining a compensation factor will be described. FIG. 2 is a cross-sectional diagram of a thin-film thermal head 27. Indicated by 1 is a heating element, 2 is a heating element substrate made of ceramics, 3 is a head mount made of aluminum, 4 is a glaze layer, 5 is a bonding layer, 6 is a wear-resistive layer, and 7 is a temperature detection means embedded in the head mount 3.

Figure 3:
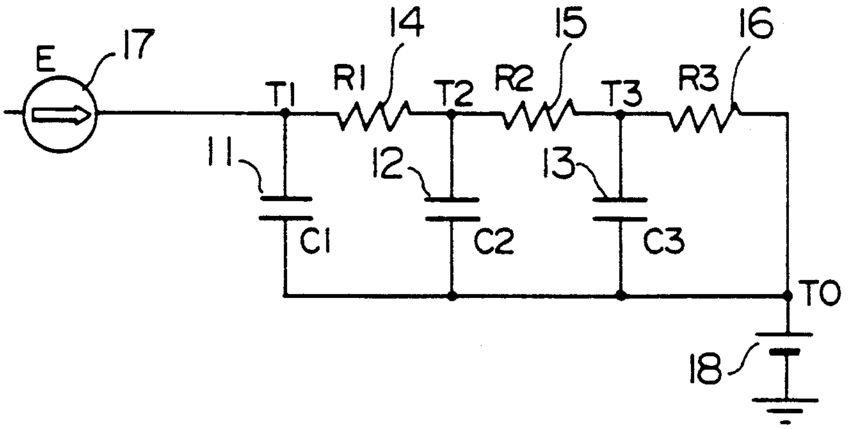
FIG. 3 is a diagram showing the model, in the form of the thermal equivalent circuit, of the thermal head.

In determining a compensation factor from the temperatures and cumulative heat energy in the portions of thermal head shown in FIG. 2, a model of the thermal head 27 expressed by the equivalent circuit shown in FIG. 3 is used in this invention. This equivalent circuit, which is based on the approximation in consideration of the thermal resistance and thermal capacity of the thermal head 27, deals with the thermal resistance, thermal capacity, temperature, and energy in unit time in terms of the electrical resistance, electrostatic capacity, voltage and current, respectively.

In FIG. 3, reference numerals 11, 12 and 13 denote the thermal capacities of the heating element 1, heating element substrate 2 and head mount 3, respectively, 14 is the thermal resistance between the heating element 1 and the heating element substrate 2 through the glaze layer, 15 is the thermal resistance between the heating element substrate 2 and the head mount 3, 16 is the thermal resistance between the head mount (including a heat sink, etc.) and the ambient air, 17 is energy (electric power) applied to the whole head in unit time, and 18 is the temperature of the environment such as the ambient air. The heating element thermal capacity 11 and thermal resistance 14 represent the total thermal capacity and total thermal resistance of all heating elements of one line.

Figure 4:
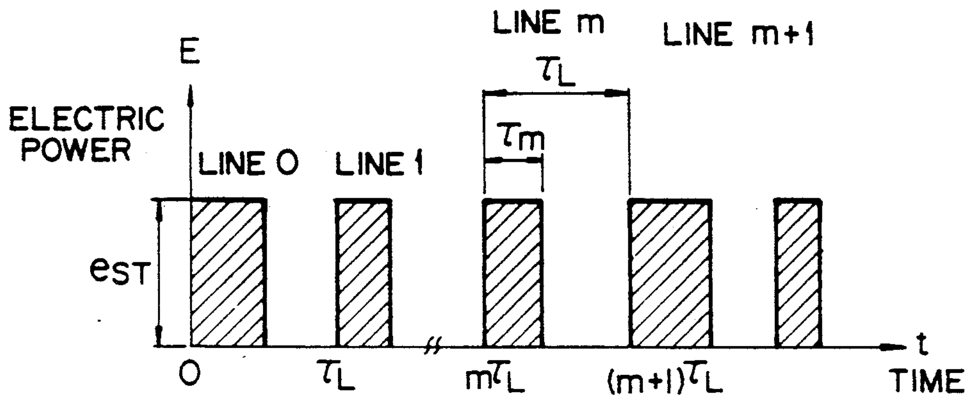
FIG. 4 is a diagram showing the waveform of application power.

The application energy 17 is set separately for each line in consideration of the practical recording condition, as shown in FIG. 4. In addition, a condition, in which the initial value of the head mount temperature $T_3$ measured by the temperature detection means 7 embedded in the head mount 3 dose not coincident with the environmental temperature $T_0$, is set in consideration of continuous recording or recording of the second and third colors in color recording.

At time t, the application power $e_{ST}$ 17 has a mean value expressed by the following formula 1:

$$E = \frac{e_{ST}}{\tau_L} \sum_{i=0}^{\infty} (\tau_i - \tau_{i-1}) \cdot U(t - i\tau_L) \tag{1}$$

where $\tau_{-1}=0$, and $U(x)=1$ when x is greater than or equal to zero, or $U(x)=0$ when x is smaller than zero.

Since the head mount temperature $T_3$ for each recording line can be measured at an appreciable accuracy with a temperature detection means 25 such as a thermister attached to the head mount 3, it is more desirable to predict the heating element substrate temperature $T_2$ with reference to the measured value of the temperature detection means 25 in addition to the initial value of each temperature and the application energy 17.

Accordingly, the equivalent circuit $T_2$–$T_3$ of FIG. 3 is solved for $T_2$ at time t as follows.

$$T_2 = T_3 + \frac{R_2 e_{ST}}{\tau_L} \sum_{i=0}^{\infty} \left[(\tau_i - \tau_{i-1}) \cdot \left\{1 - \exp\left(-\frac{\tau - i\tau_L}{C_2 R_2}\right)\right\} \cdot U(t - i\tau_L)\right] \tag{2}$$

By placing $t = m\tau_L$ and $\alpha = \exp(-\tau_L/(C_2R_2))$ for quantization, $T_2$ for line m is expressed by the following formula.

$$T_2(m) = T_3(m) + \frac{R_2 e_{ST}}{\tau_L}(1 - \alpha) \sum_{i=0}^{m-1} \tau_i \alpha^{m-i-1} \tag{3}$$

The second term of this formula represents the cumulative heat in the heating element substrate attributed by the whole-line recording in the past.

Next, the heating element temperature $T_1$, in which case the thermal time constant of the heating element is smaller by a three-digit order than that of the heating element substrate, can be evaluated by adding a temperature rise due to the cumulative heat of the heating element to the heating element substrate temperature. The variation of temperature $T_1$ at recording the m-th line is given as follows.

$$T_1(m) = T_2(m) + R_1 e_{ST}\left[\left\{1 - \exp\left(\frac{-t}{C_1 R_1}\right)\right\} - \left\{1 - \exp\left(\frac{-(t - \tau_m)}{C_1 R_1}\right)\right\} \cdot U(t - \tau_m)\right] \tag{4}$$

Figure 5:
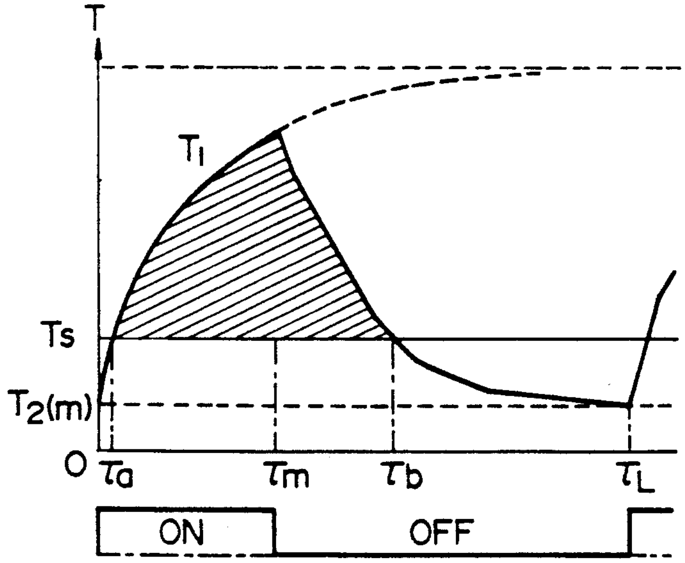
FIG. 5 is a diagram showing a temperature change of the heating element.

With the coloring temperature of ink attributable to its sublimation, melt, etc. being Ts, the energy of recording is proportional to the hatched area above Ts in FIG. 5. The hatched area S is given by the following formula.

$$S = R_1 e_{ST}(\tau_m - \tau_a) - \{T_S - T_2(m)\}(\tau_b - \tau_a) \quad (5)$$

Figure 6:
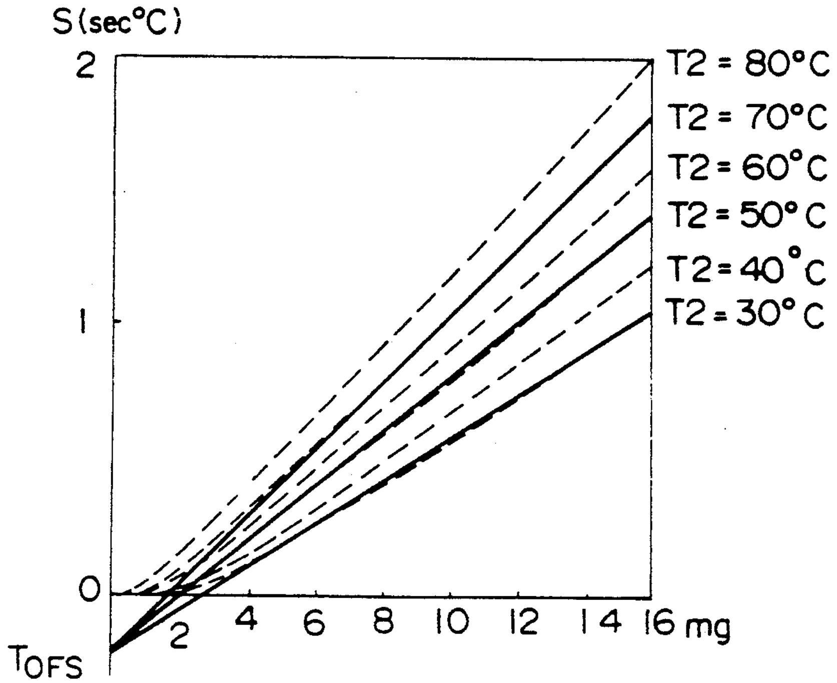
FIG. 6 is a graph showing the energy which contributes to the printing.

Because of the relationship with the current pulse width $\tau_m$ as shown in FIG. 6, the formula (5) can be approximated by the following linear function within the range of pulse width useful for recording:

$$S=\{R_1 e_{ST}-T_S+T_2(m)\}\tau_m-T_{OFF} \ldots \quad (6)$$

Next, the variation of the reference $\gamma$ characteristics against the temperature and cumulative heat will be described. The $\gamma$ characteristics of thermal recording as shown in FIG. 7 varies in response to the heating element substrate temperature $T_2$ besides the factors including the color ribbon, recording paper, thermal head characteristics, and recording conditions (recording speed, recording duty cycle, application energy). However, conditions other than temperature are constant once the printer is specified, and therefore the current pulse width $\tau_m$ needed for recording a density D for the m-th line ca be expressed by the following $\gamma$ correction function group $f_{T2}$ which represents the $\gamma$ characteristics of recorded densities against current pulse widths.

$$\tau_m = f_{T2}^{-1}(D) \quad (7)$$

The $\gamma$ correction function, with $T_2$ being a certain reference temperature $T_{2ST}$, will be expressed by $f^{-1}$, and the following explains the method of obtaining the function $f^{-1}$. Although the actual measurement of $T_2$ is difficult, it is possible for images relevant to the inventive method of creating $\gamma$ correction data to determine indirectly the $\gamma$ characteristics at a certain heating element substrate temperature by making the pulse width $\tau_p$ larger than the time constant $\alpha$ of the heating element substrate (i.e., $t >> C_2R_2$) so as to set the reference value of cumulative heat of the heating element substrate, and by measuring the density at each step of multi-step tone imaging when the head mount temperature has reached its reference temperature $T_{SST}$, i.e., When the heating element substrate temperature $T_2$ has become as follows:

$$T_{2ST}=T_{3ST}+R_2 e_{ST}\tau_p/\tau_L \ldots \quad (8)$$

Subsequently, the reference $\gamma$ characteristics f for each step of density is evaluated by using such interpolation technique as spline interpolation, and, from their inverse functions, the $\gamma$ correction functions $f^{-1}$ are calculated and stored in the ROM of the $\gamma$ correction means 20.

Accordingly, the area S' of FIG. 5, which is proportional to the energy contributive to the recording of a density D at the reference temperature and reference cumulative heat, is given by the following formula, $$S'=(R^1 e_{ST}-T_S+T_{2ST})f^{-1}(D)-T_{OFS} \ldots \quad (9)$$

Next, for the compensation through the adjustment of the current pulse width against the influence of the environmental temperature, head mount temperature and cumulative heat in the heating element substrate, S is placed equal to S', and the pulse width for recording the density D for the m-th line at a heating element substrate temperature of $T_2(m)$ is given as a product of the $\gamma$ correction function at the reference temperature and the pulse width compensation factor km, as $t_m$=km.$f^{-1}$(d). Based on the formulas (6), (8) and (9), the factor km is expressed as follows, $$km = \frac{R_1 e_{ST} - T_S + T_{3ST} + \frac{\tau_p}{\tau_L} R_2 e_{ST}}{R_1 e_{ST} - T_S + T_3(m) + \frac{R_2 e_{ST}(1-\alpha)}{\tau_L} \sum_{i=0}^{m-1} \tau_i \alpha^{m-i-1}} \quad (10)$$

The above formula has its numerator including only constants and has a constant denominator, and $T_2(m)$ can be measured on a real time basis with a thermistor or the like, whereas the term of temperature rise due to the cumulative heat in the heating element substrate necessitates a significant volume of computation for one line recording using the pulse width information for all lines in the past. The later the line is the more is computation volume is required.

According to this invention, the section of the accumulation for the past pulse width is placed as Pm in the following recurrence formula (11) so as to reduce the computation volume. By placing:

$$Pm = \sum_{i=0}^{m-1} \tau_i \alpha^{m-i-1}$$

the recurrence formula Pm is obtained as follows.

$$Pm=\alpha P_{m-1}+\tau_{m-1} \ldots \quad (11)$$

where $P_0$ is zero, and m is greater than or equal to one.

Accordingly, the compensation factor is reduced to the following:

$$km = \frac{R_1 e_{ST} - T_S + T_{3ST} + \frac{\tau_p}{\tau_L} R_2 e_{ST}}{R_1 e_{ST} - T_S + T_3(m) + \frac{R_2 e_{ST}(1-\alpha)}{\tau_L} Pm} \quad (12)$$

FIG. 8 is a graphical representation for the foregoing compensation factor, with the head mount temperature $T_3$ and the cumulative heat of heating element substrate Pm being parameters, and it forms a hyperboloid on the coordinates of $T_3$ and Pm. In the figure, the point indicated by "standard" represents the state of the moment when a density characteristics measuring image used in the invention $\gamma$ correction data generation method is recorded, and it reveals that the reference $\gamma$ correction data obtained only from this point can be expanded to arbitrary head mount temperatures and heat cumulative states of the heating element substrate by application of the compensation factor km according to this invention.

Next, another embodiment of the present invention will be described.

Figure 9:
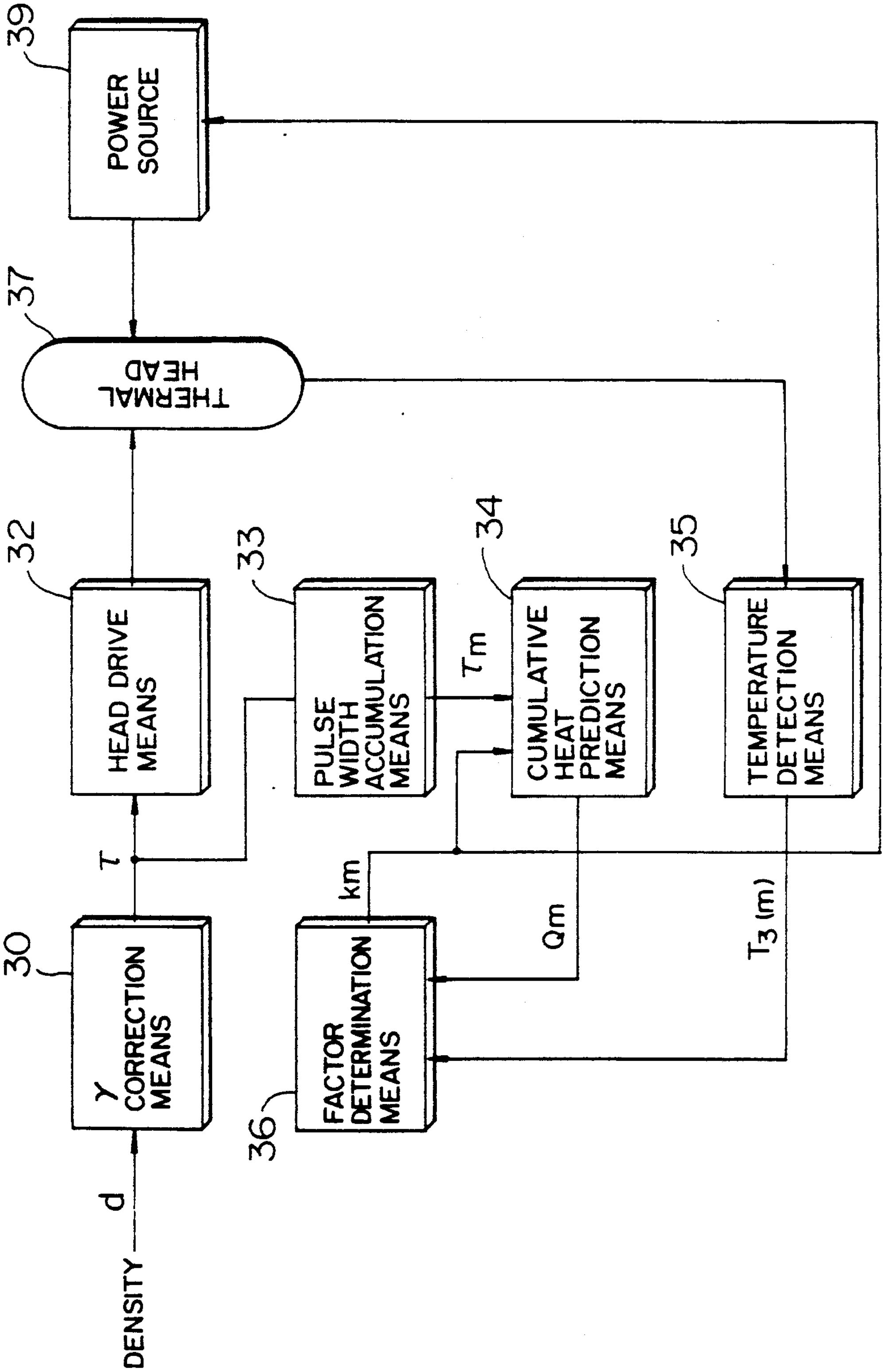
FIG. 9 is a block diagram of the tonal printer according to the second embodiment of this invention.

FIG. 9 is a block diagram of the printer according to the second embodiment of the invention. Indicated by 37 is a thermal head made up of many heating elements aligned on a heating element substrate, 39 is a power source for supplying power to the thermal head, 30 is a $\gamma$ correction means which converts density data into a corresponding application pulse width, 32 is a head drive means which drives the thermal head 37 in a multi-step pulse width, 33 is a pulse width accumulation means which accumulates pulse widths for one line to evaluate a mean pulse width, 34 is a cumulative heat prediction means which predicts the amount of cumulative heat in the heating element substrate of the thermal head 37, 35 is a temperature detection means which detects the temperature of the head mount of the thermal head 37, and 36 is a factor determination means which calculates the temperature compensation factor from the head mount temperature detected by the temperature detection means 35 and the cumulative heat of the heating element substrate predicted by the cumulative heat prediction means 34 thereby to control the output voltage of the power source 39.

The pulse width accumulation means 33 accumulates pulse widths of all pixels for one line recorded by the head drive means thereby to evaluate a mean pulse width which is proportional to the amount of cumulative heat produced in the whole thermal head 37 due to the recording of the line. The cumulative heat prediction means 34 uses the above result to predict the amount of cumulative heat caused by the total energy applied until now to the thermal head 37. The method of prediction will be explained later.

Figure 11:
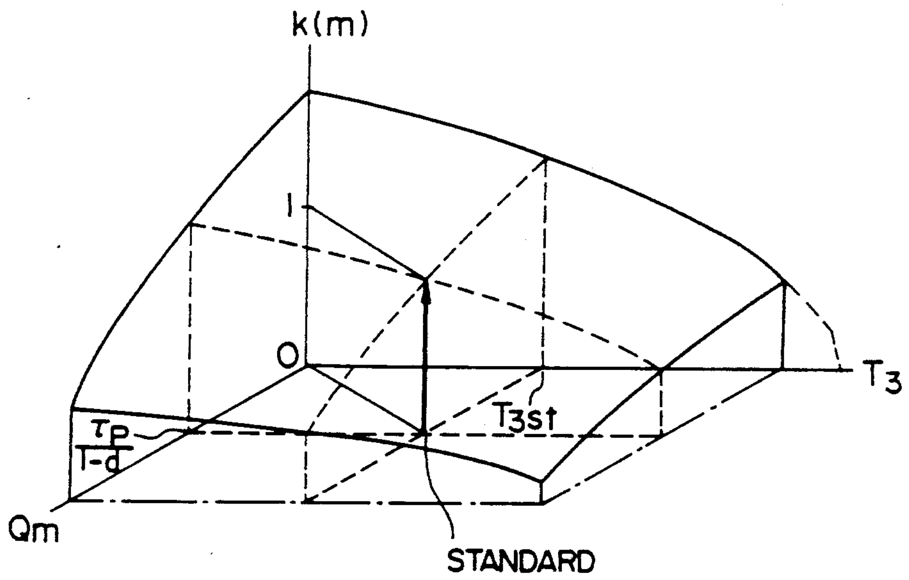
FIG. 11 is a characteristic diagram showing the compensation factor of the current pulse width for the head mount temperature and the cumulative heat according to the second embodiment of this invention.

The factor determination means 36 uses the cumulative heat of the heating element substrate predicted by the cumulative heat prediction means 34 and the head mount temperature detected by the temperature detection means 35 to calculate a compensation factor which takes a value of 1 when the head mount is at the reference temperature and the heating element substrate has the reference cumulative heat, or takes a value which simply decreases in proportion to the increase of either temperature or cumulative heat. In this embodiment, this means is formed of a ROM table which releases a compensation factor by being addressed in terms of the outputs of the cumulative heat prediction means 34 and temperature detection means 35. For example, the ROM table has a setup of data which takes a value km of 1 against the reference $T_3$ and Qm and has a parabolic function of the temperature and cumulative heat, as shown in FIG. 11.

Figure 10:
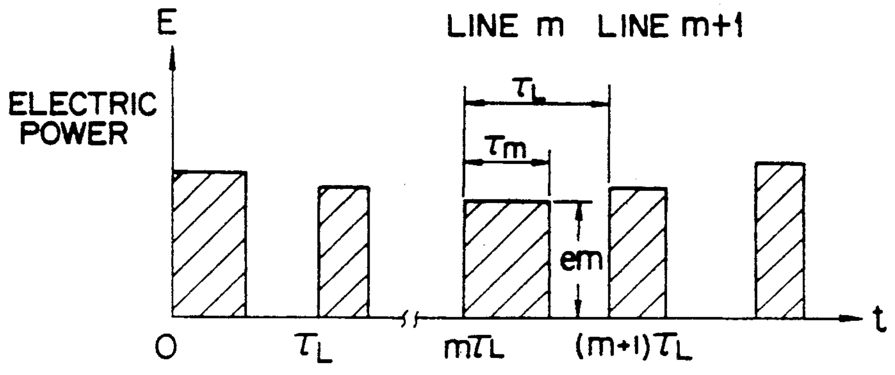
FIG. 10 is a waveform diagram of application power according to the second embodiment of this invention.

Next, the method of determining a compensation factor will be explained using a thermal model of the thermal head expressed by the same equivalent circuit of FIG. 3 as of the preceding embodiment. In this embodiment, the head voltage differs for each line due to the temperature compensation, and therefore the application energy to the heating elements also differs for each line, as shown in FIG. 10. The mean value of the application energy esT 17 at time t is expressed as follows, $$E = \frac{1}{\tau_L} \sum_{i=0}^{\infty} (e_i\tau_1 - e_{i-1}\tau_{i-1}) \cdot U(t - i\tau_L) \quad (13)$$

where $\tau_{-1}=0$, and $U(x)=1$ where x is greater than or equal to zero, or $U(x)=0$ when x is smaller than zero.

Next, the equivalent circuit $T_2$-$T_3$ of FIG. 3 is solved for $T_2$ at time t as follows:

$$T_2 = T_3 + \frac{R_2}{\tau_L} \sum_{i=0}^{\infty} [(e_i\tau_l - e_{i-1}\tau_{i-1}) \cdot \left\{1 - \exp\left(-\frac{t - i\tau_L}{C_2R_2}\right)\right\} \cdot U(t - i\tau_L)] \quad (14)$$

By placing $t=m\tau_L$ and $\alpha=\exp(-\tau L/(C_2R_2))$ for quantization, $T_2$ for the m-th line is expressed by the following formula (15), $$T_2(m) = T_3(m) + \frac{R_2}{\tau_L}(1 - \alpha) \sum_{i=0}^{m-1} \tau_i e_i \alpha^{m-i-1} \quad (15)$$

Next, the variation of temperature $T_1$ at recording the m-th line is given as follows, $$T_1(m) = T_2(m) + R_1e_m\left[\left\{1 - \exp\left(\frac{-t}{C_1R_1}\right)\right\} - \left\{1 - \exp\left(\frac{-(t-\tau_m)}{C_1R_1}\right)\right\} \cdot U(t - \tau_m)\right] \quad (16)$$

with the coloring temperature of ink attributable to its sublimation, melt, etc. being Ts, the energy of recording is proportional to the hatched area above Ts in FIG. 5. The hatched area S is given by the following formula (17), $$S = R_1e_m(\tau_m - \tau_a) - \{T_S - T_2(m)\}(\tau_b - \tau_a) \quad (17)$$

This formula (17) is approximated by the following linear function:

$$S=\{R_1e_m - T_S + T_2(m)\}\tau_m - T_{OFF} \ldots (18)$$

Next, for the compensation through the adjustment of power voltage against the influence of the environmental temperature, head mount temperature and cumulative heat in the heating element substrate, S is placed equal to S', and the compensation factor km for the reference power voltage for recording the density D for the m-th line at a heating element substrate temperature of $T_2(m)$ is expressed by the following formula, $$km^2 = 1 - \frac{T_3(m) - T_{3ST} + \frac{R_2}{\tau_L}\left\{(1 - \alpha)\sum_{i=0}^{m-1} \tau_i e_i \alpha^{m-i-1} - \tau_p e_{ST}\right\}}{R_1e_{ST}} \quad (19)$$

The term $T_3(m)$ of the formula (19) can be measured on a real time basis with a thermistor or the like, whereas the portion of temperature rise due to the cumulative heat in the heating element substrate necessitates a significant volume of computation for one line recording using the pulse width information for all lines in the past. The later the line the more computation volume is required.

According to this invention, the section of the accumulation for the past pulse widths is placed as Qm in the following recurrence formula (20) so as to reduce the computation volume. By placing:

$$Q_m = \sum_{i=0}^{m-1} \tau_i e_i \alpha^{m-i-1}$$

the recurrence formula Qm is obtained as follows:

$$Q_m = \alpha Q_{m-1} + \tau m\text{-}1 e_{m-1} \ldots \quad (20)$$

where $Q_0$ is zero, and m is greater than or equal to one.

Accordingly, the compensation factor can be calculated on a real time basis using the following formula (21), $$km^2 = 1 - \frac{T_3(m) - T_{3ST} + \frac{R_2}{\tau_L}\{(1 - \alpha)\, Q_m - \tau_p e_{ST}\}}{R_1 e_{ST}} \quad (21)$$

FIG. 11 is a graphical representation for the foregoing compensation factor, with the head mount temperature $T_3$ and the cumulative heat of heating element substrate Qm being parameters, and it forms a paraboloid on the coordinates of $T_3$ and Qm. In the figure, the point indicated by "standard" represents the measurement state of the $\gamma$ correction data, and it reveals that the reference $\gamma$ correction data obtained only from this point can be expanded to arbitrary head mount temperatures and heat cumulative states of the heating element substrate by application of the compensation factor km according to this invention. Needless to say, the input density data may be replaced with luminance data.

Next, the method of obtaining the $\gamma$ correction data by measuring the reference $\gamma$ characteristics will be explained.

Figure 12:
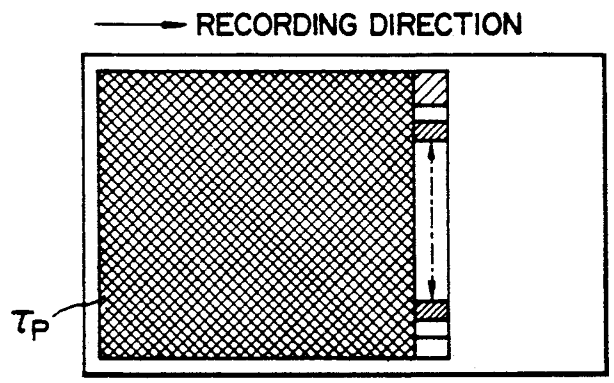
FIG. 12 is a diagram showing an example of images recorded by the inventive method of γ correction data generation.
Figure 13:
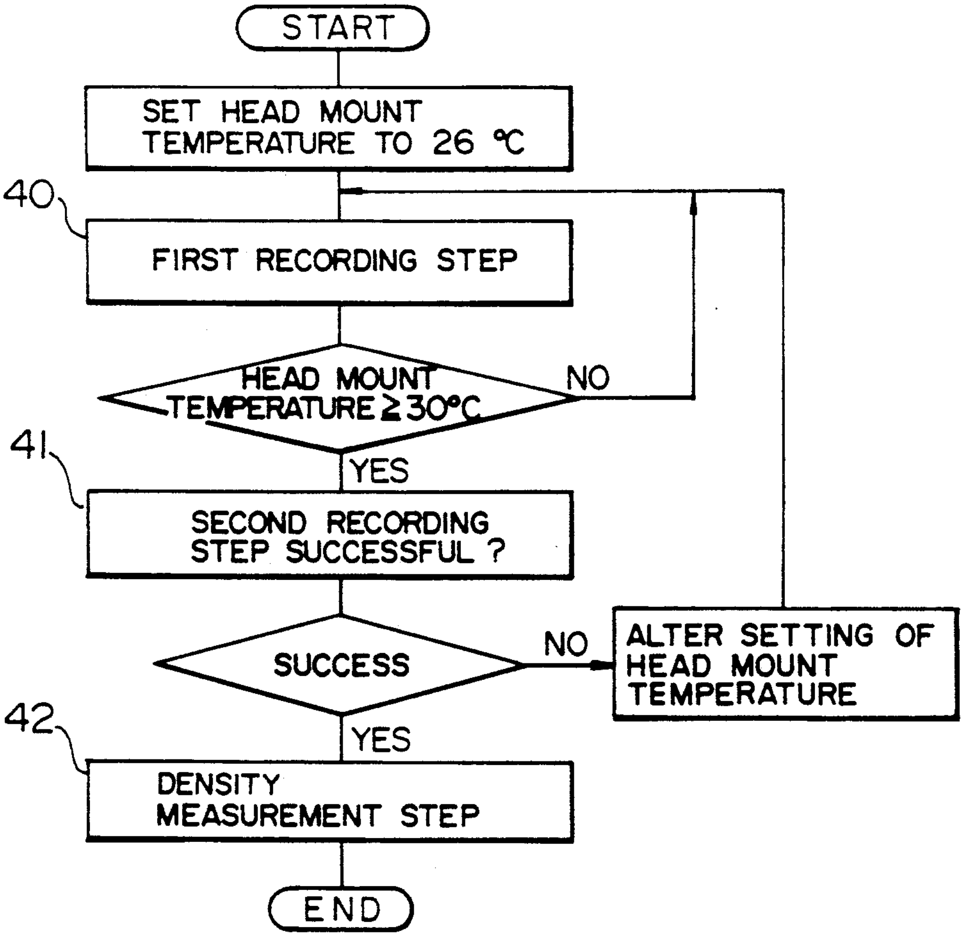
FIG. 13 is a flowchart showing the correction data generation.

FIG. 13 shows an embodiment of this invention for obtaining the $\gamma$ correction data, and FIG. 12 shows an example of recording images. The recording procedure will be explained with reference to the flowchart of FIG. 13.

Initially, in case $T_{3ST}$ is 30° C. for example, the head mount temperature $T_3$ is set to about 26° C. by using a thermal chamber or the like. Subsequently, a solid area which produces a reference pulse width $\tau_p$ that is about half the maximum pulse width is recorded in the first recording step 40 repeatedly until the head mount temperature $T_3$ reaches the 30° C. reference temperature ($T_{3ST}$). After $T_3$ has reached 30° C., a tone image, which produces current pulse widths in several different steps in the main scanning direction of the thermal head, is recorded in a sub-scanning direction with magnitudes of width sufficient for the density measurement in the second recording step 41.

If the recording time expended by the first recording step, i.e., the time period t until the head mount temperature $T_3$ has reached $T_{3ST}$, is longer than the time constant $C_2R_2$, the recording finishes, or if it is so short or so long that the image could not be recorded on the recording paper in the second recording step, the image recording is retried by altering the initial setting of the head mount temperature.

Next, the density of each tone of the tonal image recorded in the second recording step 41 is measured in the density measuring step 42. At this time, the heating element substrate temperature $T_2$ will be equal to the reference heating element substrate temperature $T_{2ST}$ given by the formula (8).

Although in this embodiment a multiplier is used for the pulse width correction means 21, a ROM table or the like which produces an equivalent output may be used. Although in this embodiment the $\gamma$ correction means 20 and pulse width correction means 21 are provided separately, they can be arranged using a two-dimensional table, or the pulse width correction means 21 and factor determination means 26 can be formed as a single ROM table or the like. Needless to say, the input density data in the above embodiment may be replaced with luminance data. The simple recording section in the image used for measuring the density characteristics may be ones that are virtually equivalent to simple recording, for the achievement of the same effect.

The present invention not only allows the printing to be free from the influence of the environmental temperature and the cumulative heat of the head mount, but it also compensates the cumulative heat of the heating element substrate which can vary considerably for each line depending on the content of the image to be recorded, whereby the density levels can be maintained constant over the whole range. Consequently, a phenomenon encountered conventionally, in which a low-density section immediately after a high-density section is recorded too thick due to the cumulative heat, can be eliminated, and a very high quality image can be recorded without a shift of hue caused by a different density in each color in three-color face sequential recording.

The use of the inventive cumulative heat prediction means requires a very small volume of computation in calculating the cumulative heat attributable to all lines in the past, and the accuracy of temperature compensation can be enhanced.

In addition, the use of the inventive factor determination means enables very accurate determination of compensation factors based on the computation from the head characteristics, recording conditions, and applied energy for the image used in the $\gamma$ correction data generation. Accordingly, the determination of compensation factors relying on many experiments or trial-and-error is not required, and moreover factors can be altered without conducting another experiment in the case of changing recording conditions such as the applied energy, recording speed, etc.

The use of the inventive $\gamma$ correction data generation method enables the stable measurement of the characteristics independently of the environmental temperature and cumulative heat at the time of measurement, whereby accurate $\gamma$ correction data can be created.

I claim:

1. A tonal printer comprising: $\gamma$correction means for converting tonal data including at least one of density data and luminance data supplied thereto into corresponding pulse width data required to obtain a predetermined recording density;

a thermal head comprising an alignment of heating elements, a heating element substrate and a head mount;

head drive means for driving each heating element of said thermal head;

a power source which supplies power to said thermal head;

cumulative head prediction means for providing an output representing a prediction of an amount of cumulative heat in a portion of said heating element substrate of said thermal head;

temperature detection means for providing an output representing a temperature in a portion of said head mount of said thermal head; and factor determination means for determining a compensation factor of energy, which is applied to said thermal head, from said output representing the temperature of said head mount and said output of said cumulative heat prediction means, said printer operating to vary the applied energy to said heating elements of said thermal head by using said compensation factor.

2. A tonal printer according to claim 1, further comprising pulse width accumulation means for accumulating current pulse widths of one line, said cumulative heat prediction means operating to predict the amount of cumulative heat in a portion of said heating element substrate by using the accumulated value of current pulse widths provided by said pulse width accumulation means and to modify the current pulse width based on the compensation factor provided by said factor determination means.

3. A tonal printer according to claim 2, wherein said cumulative heat prediction means operates to predict a value Pm which is proportional to the amount of cumulative heat in a portion of said heating element substrate accumulated until recording to an m-th line based on a recurrence formula: $Pm=\tau_{m-1}+P_{m-1}\alpha$, $(P_0=0)$ where $\alpha$ is equal to $\exp(-\tau_L/(C_2R_2)$, $C_2$ is a thermal capacity of the heating element substrate, $R_2$ is a thermal resistance from the heating element substrate to the heat mount, $\tau_m$ is a mean value of the current pulse width for the m-th line (m is a positive integer), and $\tau_L$ is a recording period.

4. A tonal printer according to claim 3, wherein said factor determination means operates to determine a compensation factor km of the pulse width for the m-th line by using a hyperbolic relationship between the head mount temperature $T_3(m)$ measured by said temperature detection means during recording of the m-th line and said value Pm.

5. A tonal printer according to claim 3, wherein said factor determination means operates to determine the compensation factor km of the pulse width for the m-th line based on a formula:

$$km = \frac{R_1e_{ST} - T_S + T_{3ST} + \frac{\tau_P}{\tau_L} R_2e_{ST}}{R_1e_{ST} - T_S + T_3(m) + \frac{R_2e_{ST}(1-\alpha)}{\tau_L} Pm}$$

where $R_1$ is a thermal resistance from the heating element to the heating element substrate, $e_{ST}$ is an application power, Ts is a coloring temperature of recording ink, and $T_3(m)$ is a head mount temperature during the recording of the m-th line, with a reference cumulative heat achieved by a continuous application of power with a pulse width P which is longer than a time constant $C_2R_2$ of the heating element substrate and at a ratio to a current pulse width at a reference head mount temperature $T_{3ST}$.

6. A tonal printer according to claim 1, further comprising pulse width accumulation means for accumulating current pulse widths of one line, said cumulative heat prediction means operating to predict the amount of cumulative heat in a portion of said heating element substrate by using an accumulated value of current pulse widths provided by said pulse width accumulation means and application power and to modify a power voltage based on the compensation factor provided by said factor determination means.

7. A tonal printer according to claim 6, wherein said cumulative heat prediction means operates to predict a value Qm which is proportional to the amount of cumulative heat in a portion of said heating element substrate accumulated until recording of an m-th line based on a recurrence formula: $Qm=\tau_{m-1}e_{m-1}+Q_{m-1}\ \alpha$, $(Q_0=0)$ where $\alpha$ is equal to $\exp(-\tau_L/(C_2R_2))$, $C_2$ is a thermal capacity of the heating element substrate, $R_2$ is a thermal resistance from the heating element substrate to the head mount, $\tau_m$ is a mean value of the current pulse width for the m-th line (m is a positive integer), $e_m$ is an application power for the m-th line, and $\tau_L$ is a recording period.

8. A tonal printer according to claim 7, wherein said factor determination means operates to determine the compensation factor km of the power voltage for the m-th line by using a parabolic relationship between the head mount temperature $T_3(m)$ measured by said temperature detection means during recording of the m-th line and said value Qm.

9. A tonal printer according to claim 7, wherein said factor determination means operates to determine the compensation factor km of the power voltage for the m-th line based on a formula:

$$km^2 = 1 - \frac{T_3(m) - T_{3ST} + \frac{R_2}{\tau_L}\{(1-\alpha)Q_m - \tau_P e_{ST}\}}{R_1e_{ST}}$$

where $R_1$ is a thermal resistance from the heating element to the heating element substrate, Ts is a coloring temperature of recording ink, and $T_3(m)$ is a head mount temperature during the recording of the m-th line, with a reference cumulative heat achieved by a continuous application of power $e_{ST}$ with a pulse width $\tau_p$ which is longer than a time constant $C_2R_2$ of the heating element substrate and at a ratio to a current pulse width at the reference head mount temperature $T_{3ST}$.

10. A method for setting a characteristic of $\gamma$ correction means in a tonal printer including a thermal head comprising an alignment of heating elements, a heating element substrate and a head mount, said method comprising:

a first recording step wherein a solid area recording is produced by uniformly applying a pulse of a width $\tau_p$ to each of said thermal elements in said thermal head at a state that a head mount temperature in said thermal head is lower than a given reference temperature $T_{3ST}$, a second recording step including grouping said thermal elements in said thermal head into plural groups after the head mount temperature has reached said reference temperature $T_{3ST}$ and applying pulses of stepped different widths respectively to said groups, thereby allowing a recording operation for a predetermined time in a sub-scanning direction to be made, a density measurement step wherein the density of the image recorded by said second recording step is measured and the relationship between the pulse width and the density is detected, and a step for setting the characteristics of the $\gamma$ correction means based on said detected relationship between pulse width and density, whereby a recording time for the first recording step becomes longer than a time constant determined by a thermal capacity of a thermal mount in said thermal head and a thermal resistance between said thermal element substrate and said head mount.

* * * * *